US009468985B2

(12) United States Patent
Tezuka et al.

(10) Patent No.: US 9,468,985 B2
(45) Date of Patent: Oct. 18, 2016

(54) SYSTEM FOR CALCULATING THREAD PITCH

(71) Applicant: FANUC CORPORATION, Minamitsuru-gun, Yamanashi (JP)

(72) Inventors: Junichi Tezuka, Yamanashi (JP); Hajime Ogawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/789,180

(22) Filed: Jul. 1, 2015

(65) Prior Publication Data

US 2016/0008901 A1    Jan. 14, 2016

(30) Foreign Application Priority Data

Jul. 8, 2014 (JP) .................................. 2014-140799

(51) Int. Cl.
*G01B 21/22* (2006.01)
*B23G 3/08* (2006.01)
*G05B 19/18* (2006.01)

(52) U.S. Cl.
CPC .............. *B23G 3/08* (2013.01); *G05B 19/186* (2013.01); *B23G 2240/52* (2013.01); *G05B 2219/45215* (2013.01); *G05B 2219/49196* (2013.01)

(58) Field of Classification Search
CPC ......................... B23G 2240/52; G05B 19/186
USPC ....................... 73/104; 33/199 B, 199 R, 829
See application file for complete search history.

(56) References Cited

U.S. PATENT DOCUMENTS

| | | | | |
|---|---|---|---|---|
| 4,275,507 A | * | 6/1981 | von Haas | G01B 7/283 33/199 B |
| 4,353,018 A | * | 10/1982 | Kohzai | G05B 19/186 318/571 |
| 5,199,175 A | * | 4/1993 | Green | G01B 3/48 33/199 R |
| 5,404,308 A | * | 4/1995 | Kajiyama | G05B 19/4166 318/568.18 |
| 5,814,956 A | * | 9/1998 | Kono | G05B 19/4063 318/380 |
| 6,145,207 A | * | 11/2000 | Brunson | G01B 3/205 33/199 B |
| 6,155,148 A | * | 12/2000 | Shinozaki | G05B 19/186 409/66 |
| 2010/0264867 A1 | * | 10/2010 | Iwashita | G05B 19/416 318/635 |
| 2013/0104407 A1 | * | 5/2013 | Lee | G01B 5/163 33/199 R |
| 2014/0167672 A1 | * | 6/2014 | Tezuka | G05B 19/404 318/632 |
| 2014/0200707 A1 | * | 7/2014 | Irie | G05B 19/182 700/160 |
| 2015/0205282 A1 | * | 7/2015 | Tezuka | G06F 17/10 700/160 |

FOREIGN PATENT DOCUMENTS

| | | |
|---|---|---|
| CN | 102629119 | 8/2012 |
| CN | 103576605 | 2/2014 |
| CN | 103872973 | 6/2014 |
| JP | 2008136110 | 6/2008 |
| JP | 2008-226112 A | 9/2008 |
| JP | 2013027967 | 2/2013 |

* cited by examiner

*Primary Examiner* — Eric S McCall
(74) *Attorney, Agent, or Firm* — RatnerPrestia

(57) ABSTRACT

A system which makes it possible to judge causes of fluctuation in thread pitches is provided. The system which calculates thread pitches includes a first detection part that detects rotation angles of a rotary shaft, a second detection part that detects movement amounts of a feed shaft, and a calculation part that, based on the rotation angles detected by the first detection part and the movement amounts detected by the second detection part, calculates the movement amounts for each rotation of the rotary shaft in forming threads on a workpiece W.

5 Claims, 3 Drawing Sheets

SYSTEM FOR CALCULATING THREAD PITCH

BACKGROUND OF THE INVENTION

1. Field of the Invention

The invention relates to a system for calculating thread pitches of screw threads formed on a workpiece by a machine tool which includes a rotary shaft and a feed shaft.

2. Description of the Related Art

A numerically controlled machining system is known which includes a rotary shaft for rotating a workpiece and a feed shaft for moving a tool for machining the workpiece and which calculates an error between an ideal movement amount and an actual movement amount of the feed shaft so as to evaluate the accuracy of the threading process by monitoring and verifying the error (for example, Japanese Laid-open Patent Publication No. 2008-226112).

According to prior art, since it has been impossible to understand the effect derived from the error between the ideal movement amount and the actual movement amount of the feed shaft by the thread pitches of the actually formed threads, it has been impossible to carry out comparative verification by correlating the actual thread pitches and the above-described error.

Accordingly, when there is an inappropriate fluctuation in the formed thread pitches, it has been difficult to judge whether the fluctuation is caused by a problem in controlling the rotary shaft and the feed shaft or caused by factors other than the control of the rotary shaft and the feed shaft.

SUMMARY OF THE INVENTION

In an aspect of the invention, a system for calculating a thread pitch of threads formed on a workpiece by a synchronized operation between a rotary shaft which rotates the workpiece and a feed shaft which feeds a tool comprises a first detection part which detects a rotation angle of the rotary shaft, a second detection part which detects a movement amount of the feed shaft, and a calculation part which calculates the movement amount for each rotation of the rotary shaft when forming threads on the workpiece, based on the rotation angle detected by the first detection part and on the movement amounts detected by the second detection part.

The system may further comprise a display which displays the movement amount for each rotation calculated by the calculation part. The calculation part may calculate the movement amount for each rotation by using a predetermined rotation angle as a starting point.

The predetermined rotation angle may be a rotation angle of the rotary shaft at the point of time when the threading on the workpiece is started. The calculation part may further calculate at least one of a minimum value, a maximum value, and a mean value of the movement amount for each rotation.

BRIEF DESCRIPTION OF THE DRAWINGS

The above-described or other objects, features, and effects of the invention will be made clear from the following description of an embodiment with reference to the accompanying drawings.

DETAILED DESCRIPTION

Figure 1:
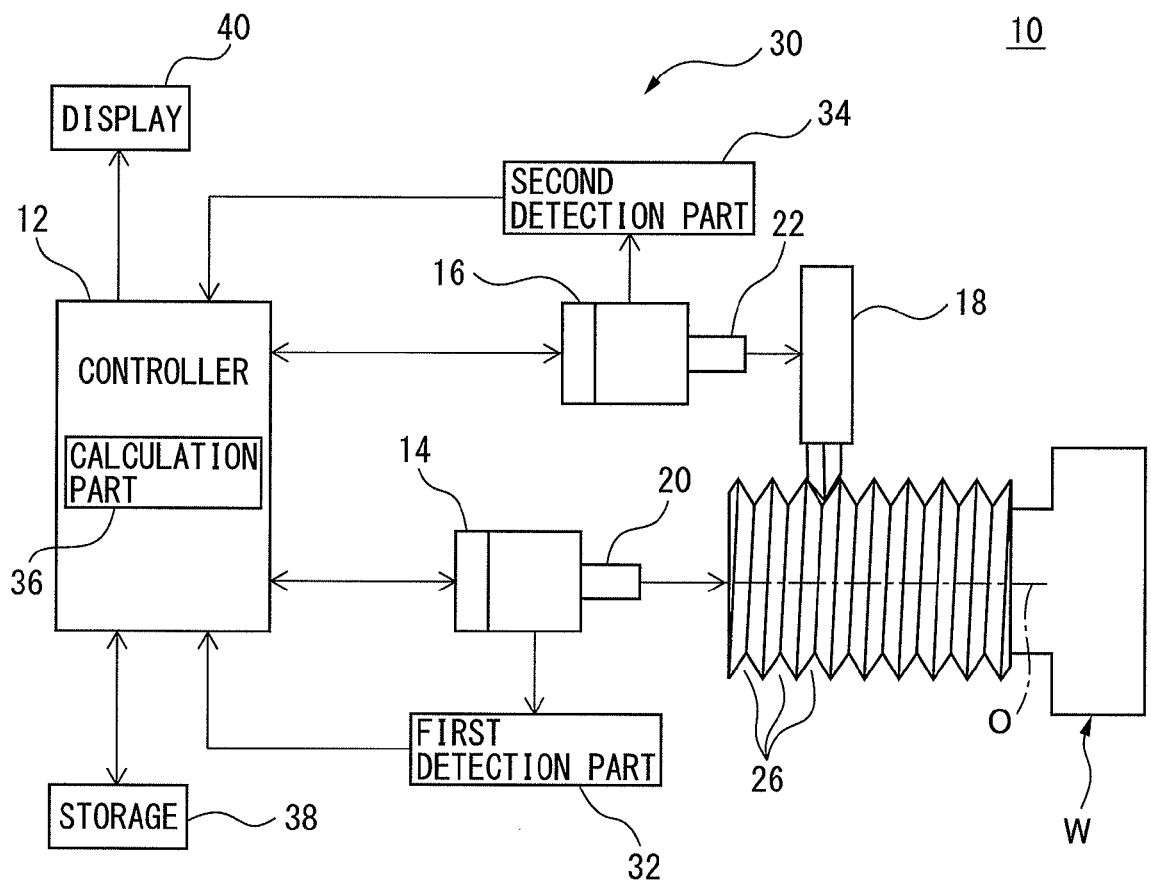
FIG. 1 illustrates a block diagram of a machining system according to an embodiment of the invention.

An embodiment of the invention will be described in detail below based on the accompanying drawings. First, with reference to FIG. 1, a machining system 10 according to an embodiment of the invention will be described. Note that, in the following description, the axial direction indicates the direction along the rotation axis of a rotary shaft 20 and a workpiece W described later.

The machining system 10 is for threading on the workpiece W, and includes a controller 12, a first drive part 14, a second drive part 16, a tool 18 for machining the workpiece W, the rotary shaft 20 fixed to the workpiece W, and a feed shaft 22 fixed to the tool 18.

The controller 12 controls the first drive part 14 and the second drive part 16 so that the first drive part 14 and the second drive part 16 operate in synchronization with each other. The first drive part 14 is comprised of e.g. a servo motor, and rotates the rotary shaft 20 about the rotation axis O in accordance with a command from the controller 12. As the rotary shaft 20 is rotated, the workpiece W is driven to rotate about the rotation axis O together with the rotary shaft 20.

The second drive part 16 moves the feed shaft 22 along the workpiece W in accordance with a command from the controller 12. In the present embodiment, the second drive part 16 moves the feed shaft 22 in the axial direction. For example, the second drive part 16 is comprised of a servo motor and a ball screw mechanism for converting the rotational movement of the output shaft of the servo motor to the axial movement. Alternatively, the second drive part 16 is comprised of a linear motor.

As the feed shaft 22 is moved by the second drive part 16, the tool 18 moves along the workpiece W together with the feed shaft 22. When machining the workpiece W, the tool 18 is pressed against the outer periphery of the workpiece W, and forms threads 26 on the outer periphery of the workpiece W.

The machining system 10 further includes a system 30 for calculating the thread pitch of the threads 26 formed on the workpiece W. The system 30 includes a first detection part 32, a second detection part 34, and a calculation part 36. The first detection part 32 detects a rotation angle θ of the rotary shaft 20, and transmits it to the controller 12. The first detection part 32 is comprised of e.g. an encoder or a Hall element.

The second detection part 34 detects a movement amount ξ of the feed shaft 22, and transmits it to the controller 12. In the present embodiment, the second detection part 34 detects a movement amount ξ in the axial direction of the feed shaft 22. For example, when the second drive part 16 is comprised of a servo motor, the second detection part 34 includes an encoder for detecting a rotation angle θ' of this servo motor.

In this case, the second detection part 34 converts the rotation angle θ' detected by the encoder to the movement amount ξ in the axial direction of the feed shaft 22, and transmits it to the controller 12. Alternatively, when the second drive part 16 is comprised of a linear motor, the second detection part 34 may include a displacement sensor capable of directly measuring the movement amount ξ of the feed shaft 22.

In the present embodiment, the controller 12 has a function of the calculation part 36. The controller 12 functions as the calculation part 36 so as to calculate a nominal thread pitch for control which corresponds to an actual thread pitch of the threads formed on the workpiece W, on the basis of the rotation angle θ of the rotary shaft 20 received from the first detection part 32 and of the movement amount ξ of the feed shaft 22 received from the second detection part 34. This function will be described later.

The system 30 further includes a storage 38 and a display 40. The storage 38 is e.g. an electrically erasable and recordable nonvolatile memory such as EEPROM (registered trademark) or the like.

The controller 12 communicates with the storage 38 and records or deletes data in/from the storage 38. The display 40 is comprised of e.g. a liquid crystal display, an organic EL display, or the like. The display 40 receives image data from the controller 12 and displays an image corresponding to the image data.

Next, with reference to FIGS. 1 to 3, a method of threading the workpiece W by the machining system 10 will be described. When threading the workpiece W, the controller 12 transmits a command to the first drive part 14 so as to rotate the workpiece W.

Figure 2:
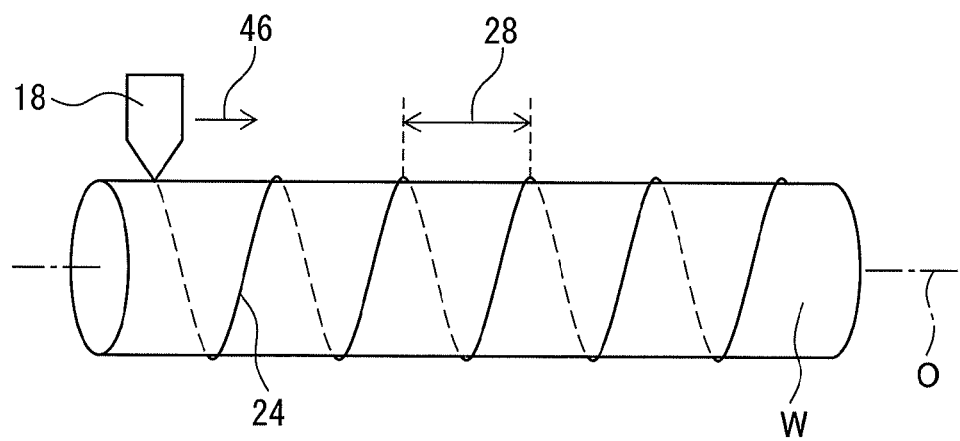
FIG. 2 is a diagram for explaining the thread cutting process on the workpiece.
Figure 3:
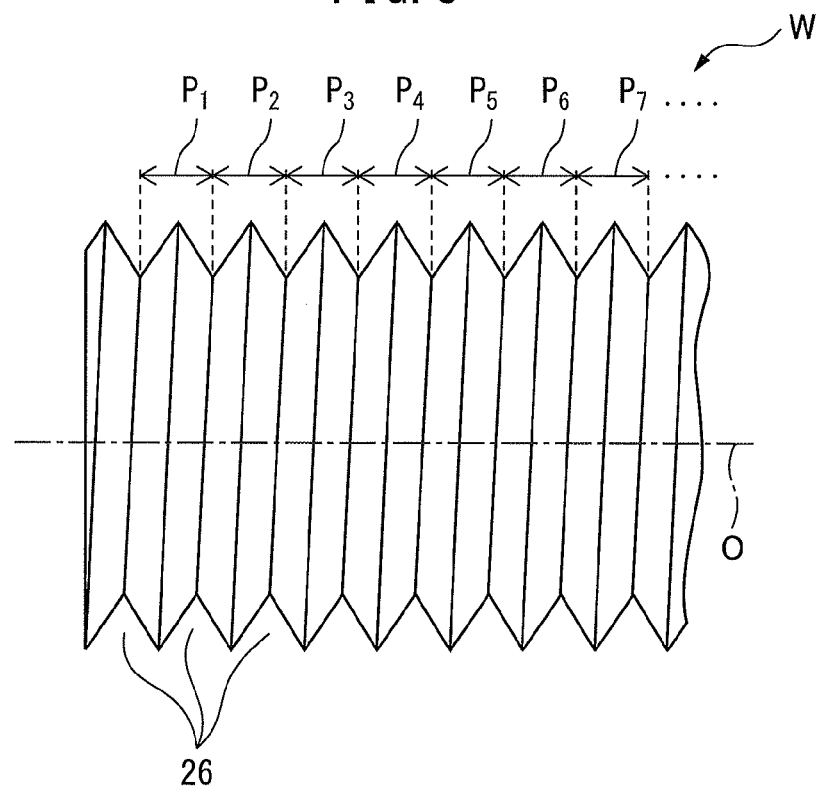
FIG. 3 illustrates a threaded workpiece.

Then, the controller 12 transmits a command to the second drive part 16 so as to move the tool 18 arranged to be pressed against the outer periphery of the workpiece W in the axial direction, as indicated by an arrow 46 in FIG. 2. As a result, the tool 18 relatively moves on the outer periphery of the workpiece W in a spiral manner as indicated by a path 24 in FIG. 2, and forms a plurality of grooves of the threads 26 on the outer periphery of the workpiece W as shown in FIG. 3.

The threads 26 are successively formed from the point of time when the machining of the workpiece W is started so as to have thread pitches $P_1, P_2, P_3, \ldots P_n$. Each of the thread pitches $P_1, P_2, P_3, \ldots P_n$ corresponds to a movement distance 28 (FIG. 2) of the tool 18 in the axial direction when the workpiece W rotates by one rotation (i.e., rotates 360°).

When executing the threading process, the controller 12 controls the movement amount ξ of the feed shaft 22 driven by the second drive part 16 with reference to the rotation angle θ received from the first detection part 32. Specifically, the controller 12 calculates a value obtained by multiplying the received rotation angle θ with a synchronization ratio (=[the movement command value for the feed shaft 22 corresponding to a predetermined thread pitch target value $P_{Ref}$]/360°).

Then, the controller 12 transmits a movement command corresponding to the calculated value to the second drive part 16. In this way, the controller 12 controls the movement amount ξ of the feed shaft 22 in synchronization with the rotation angle θ of the rotary shaft 20 so as to form the threads 26 on the workpiece W by the pitches of the target value $P_{Ref}$.

However, thread pitches $P_1, P_2, P_3, \ldots P_n$ of the threads 26 which are actually formed on the workpiece W may vary so as to deviate from the target value $P_{Ref}$ due to various factors. The system 30 according to the present embodiment calculates nominal thread pitches for control corresponding to the actual thread pitches $P_1, P_2, P_3, \ldots P_n$, based on the rotation angle θ of the rotary shaft 20 and the movement amount ξ of the feed shaft 22.

The function of the system 30 will be described below. Note that, for easier understanding, it is assumed that the rotation angle θ at the point of time when the threading on the workpiece W is actually started is set to 0°. After the threading is started, the controller 12 measures the rotation angle θ of the rotary shaft 20 and the movement amount ξ(θ) of the feed shaft 22 which corresponds to the rotation angle θ, via the first detection part 32 and the second detection part 34, respectively. The movement amount ξ(θ) indicates the movement amount ξ of the feed shaft 22 when the rotary shaft 20 is rotated by angle θ.

The controller 12 stores the rotation angle θ and the movement amount ξ(θ) received from the first detection part 32 and the second detection part 34 in the storage 38. As an example, the controller 12 measures the movement amount ξ(θ) of the feed shaft 22 at intervals of a predetermined rotation angle θ (for example, 10°), and stores it in the storage 38. In this way, the rotation angle θ and the movement amount ξ(θ) are stored in the storage 38 in association with each other.

Then, the controller 12 functions as the calculation part 36 so as to calculate the movement amount for each rotation of the rotary shaft 20 based on the obtained rotation angle θ and movement amount ξ(θ). Specifically, the controller 12 reads out the movement amount ξ(360°×n) which corresponds to the rotation angle θ=360°×n ("n" is a positive integer) from the storage 38, and calculates the movement amount P(n) for each rotation in accordance with the following formula 1.

$$P(n)=\xi(360°\times n)-\xi(360°\times(n-1)) \quad \text{(Formula 1)}$$

The technical idea of this calculation will be described in detail with reference to the graph in FIG. 4. The origin O in FIG. 4 indicates a point of time when the threading on the workpiece W is started. The value denoted by P(1) in FIG. 4 is calculated by assigning n=1 to above formula 1, and equal to the movement amount) ξ(360°) of the feed shaft 22 when the rotary shaft 20 rotates by 360° from the point of time when the threading is started.

The value P(1) correlates with the command value sent from the controller 12 to the first drive part 14 and the second drive part 16 during the first turn of the threads 26 (i.e., the leftmost thread 26 in FIG. 3) is formed. The value P(1) can be considered as a nominal thread pitch P(1) for control which corresponds to an actual thread pitch $P_1$ of the actually-formed first turn of the threads 26.

Figure 4:
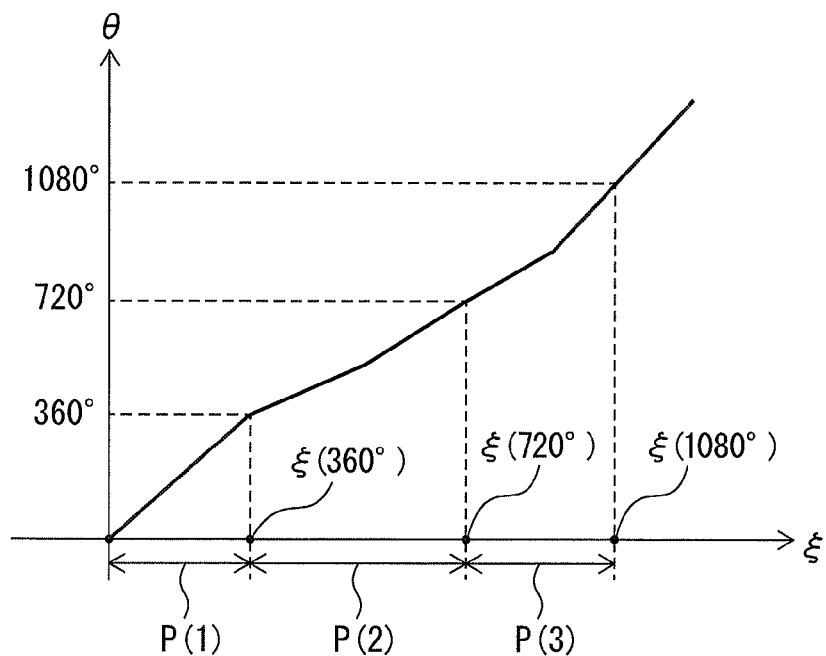
FIG. 4 is a graph for explaining the principle of the system for calculating the thread pitch according to an embodiment of the invention, wherein the vertical axis represents a rotation angle of the rotary shaft, and the horizontal axis represents a movement amount of the feed shaft.

On the other hand, a value denoted by P(2) in FIG. 4 is calculated by assigning n=2 to above formula 1. Specifically, P(2) is a value obtained by subtracting the movement amount ξ(360°) from a movement amount ξ(720°) when the rotary shaft 20 rotates by 720°.

The value P(2) correlates with the command value sent from the controller 12 to the first drive part 14 and the second drive part 16 during the second turn of the threads 26 (i.e., the second thread 26 from the left in FIG. 3) is formed. The value P(2) can be considered as a nominal thread pitch P(2) for control which corresponds to an actual thread pitch $P_2$.

Similarly, a value denoted by P(3) in FIG. 4 is calculated by assigning n=3 to above formula 1. Specifically, P(3) is a value obtained by subtracting the movement amount ξ(720°) from a movement amount ξ(1080°) when the rotary shaft 20 rotates by 1080°.

The value P(3) correlates with the command value sent from the controller 12 to the first drive part 14 and the second drive part 16 during the third turn of threads 26 (i.e., the third thread 26 from the left in FIG. 3) is formed. The value P(3) can be considered as a nominal thread pitch P(3) for control which corresponds to an actual thread pitch $P_3$.

Thus, in the system 30 according to the present embodiment, the controller 12 functions as the calculation part 36 so as to calculate the movement amounts P(1) to P(n) for each rotation of the rotary shaft 20 (i.e., the nominal thread pitches P(1) to P(n) for control), based on above formula 1. The movement amounts P(1) to P(n) calculated in this way are illustrated in the following Table 1.

TABLE 1

| Rotation Angle θ [°] | 360 | 720 | 1080 | — | 360 × n |
|---|---|---|---|---|---|
| Rotation Number "n" [rev] | 1 | 2 | 3 | — | n |
| Movement Amount P(n) for Each Rotation [mm] | 1.43 | 1.48 | 1.51 | — | 1.49 |

The controller 12 also calculates a maximum value, a minimum value, and a mean value of the calculated movement amounts P(1) to P(n). The maximum value, the minimum value, and the mean value calculated in this way are illustrated in the following Table 2.

TABLE 2

| Max. Value [mm] | 1.52 |
|---|---|
| Min. Value [mm] | 1.43 |
| Mean Value [mm] | 1.50 |

The controller 12 stores data illustrated in Tables 1 and 2 in the storage 38. Then, the controller 12 drives the display 40 to display the data. By this operation, the user can understand the rotation number "n" of the rotary shaft 20 and the movement amount P(n) corresponding to the rotation number "n". As a result, it becomes possible for the user to compare the thread pitches $P_1$-$P_n$ of the actually-formed threads 26 with the movement amounts P(1) to P(n) (i.e., the nominal thread pitches for control).

When inappropriate fluctuations are observed in the actual thread pitches $P_1$-$P_n$, the user can analyze the cause of such fluctuations by comparing the thread pitches $P_n$ with the movement amount P(n). This function will be described below.

It is assumed that, as a result of comparison between the actually-measured thread pitches $P_1$ to $P_n$ and the calculated movement amounts P(1) to P(n), similar tendencies are observed in changes among the thread pitches $P_1$ to $P_n$ and in changes among the movement amounts P(1) to P(n) (for example, $P_1$ to $P_3 < P_{Ref} < P_4$ to $P_n$, and P(1) to P(3) < $P_{Ref}$ < P(4) to P(n)).

As described above, P(n) is a nominal thread pitch P(n) for control which correlates with the command value sent from the controller 12 to the first drive part 14 and the second drive part 16 during the n-th turn of the thread 26 is formed. Therefore, when the similar tendencies are observed between $P_n$ and P(n), the fluctuation in the thread pitches is likely to be caused due to the control of the first drive part 14 and the second drive part 16 by the controller 12.

Accordingly, in this case, the user can judge that it is possible to control fluctuations in the actual thread pitches $P_1$ to $P_n$ by adjusting the command value sent from the controller 12 to the first drive part 14 and the second drive part 16.

On the other hand, it is assumed that no similar tendency is observed between fluctuation in the actually-measured thread pitches $P_1$ to $P_n$ and fluctuation in the calculated movement amounts P(1) to P(n). In this case, the fluctuation in the thread pitches is likely to be caused due to mechanical factors such as unevenness in rigidity of the workpiece W or attachment of a foreign material to the workpiece W, other than the control by the controller 12. Accordingly, in this case, the user can judge that a countermeasure against the mechanical causes needs to be taken.

Thus, when inappropriate fluctuations occur in the actual thread pitches $P_1$ to $P_n$, the user can analyze the cause of the fluctuations by comparing the thread pitch $P_n$ with the movement amount P(n). Due to this, the user can take countermeasures effectively in order to reduce such inappropriate fluctuations.

Further, according to the present embodiment, the user can visually check the data tables as shown in Tables 1 and 2 via the display 40. Due to this, the user can effectively compare the actual thread pitch $P_n$ and the calculated movement amount P(n), and analyze them.

In the above-mentioned embodiment, from the viewpoint of easier understanding, a case was described where the rotation angle of the workpiece W at the point of time when the threading on the workpiece is started is set to be 0°, and the movement amounts P(1) to P(n) for each rotation are calculated by using θ=0° as a basis (starting point). However, the controller 12 may calculate the movement amounts P(1) to P(n) for each rotation by using a predetermined rotation angle $θ_{S1}$ as a basis. This configuration will be described with reference to FIGS. 5 and 6.

Figure 5:
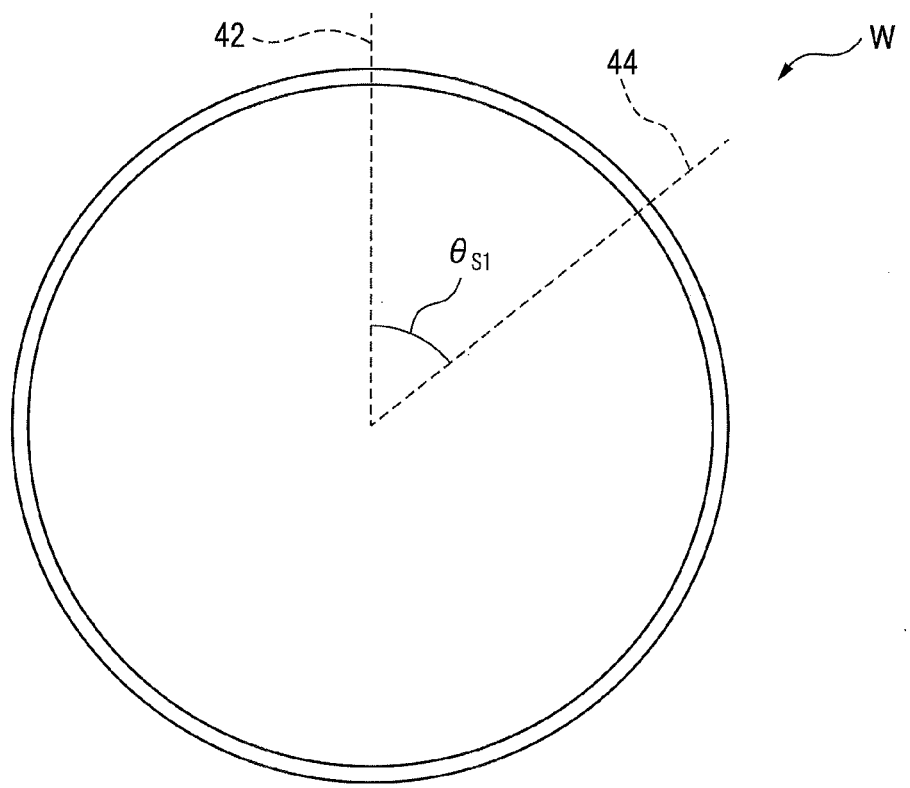
FIG. 5 is a diagram for explaining a predetermined rotation angle, and illustrating a workpiece viewed from an axial direction.

A dotted line 42 in FIG. 5 indicates a position of the tool 18 with respect to the workpiece W at the point of time when the machining system 10 starts the operation. At this time, the controller 12 starts to operate of the rotary shaft 20, the feed shaft 22, the first detection part 32, and the second detection part 34, and acquire data on the rotation angle θ and the movement amount ξ.

Figure 6:
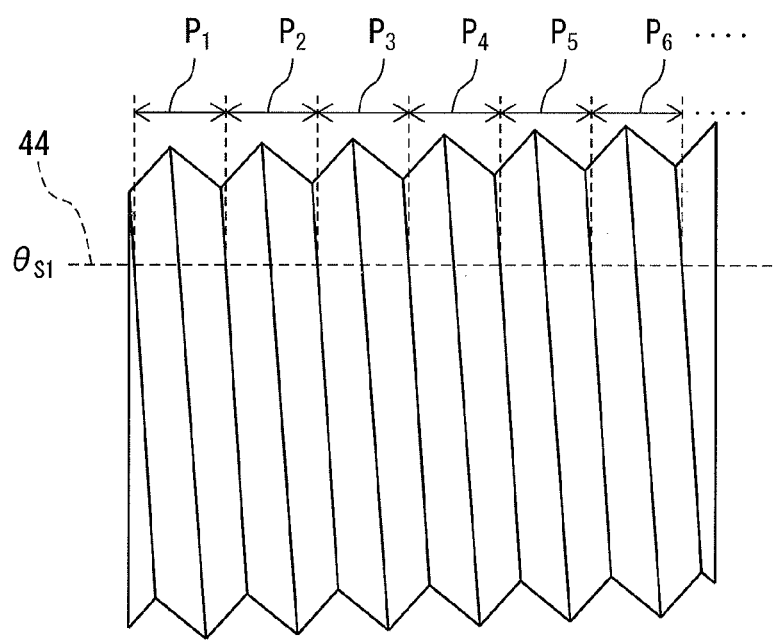
FIG. 6 is a diagram of the workpiece shown in FIG. 5 when viewed from a radial direction.

On the other hand, when the rotary shaft 20 is rotated by a predetermined rotation angle $θ_{S1}$, the tool 18 is arranged at a position where the tool 18 is rotated relatively to the workpiece W by angle $θ_{S1}$ from the position indicated by the dotted line 42, as indicated by the dotted line 44 in FIGS. 5 and 6.

The user can instruct the controller 12 so as to calculate the movement amounts P(1) to P(n) for each rotation by using the rotation angle $θ_{S1}$ as a basis (starting point). When receiving such instruction from the user, the controller 12 calculates the movement amounts P(1) to P(n) for each rotation in accordance with the following formula 2.

$$P(n) = ξ(θ_{S1} + 360° × n) - ξ(θ_{S1} + 360° × (n-1))$$ (Formula 2)

With this formula, the controller 12 can calculate the movement amounts P(1), P(2), . . . P(n) for each rotation from the rotation angle $θ_{S1}$. Then, the user can compare these movement amounts P(1), P(2), . . . P(n) with actual thread pitches $P_1$, $P_2$, $P_3$, . . . $P_n$ at the position of the dotted line 44 in FIG. 6.

The predetermined rotation angle $θ_{S1}$ may be defined as a rotation angle of the rotary shaft 20 at the point of time where the threading (i.e., machining) on the workpiece W is actually started. In this case, the users can evaluate the fluctuations in the thread pitches $P_1$ to $P_n$ on the basis of the starting point of the threads 26.

Further, the controller 12 may calculate the movement amounts P(1) to P(n) for each rotation by using a plurality of predetermined rotation angles $θ_{S1}$, $θ_{S2}$, . . . $θ_{Sn}$ as bases (starting points). As an example, the following Table 3 are represented in which the movement amounts P(1) to P(n) for each rotation are calculated by using the rotation angles $\theta_{S1}$ to $\theta_{S4}$ as bases.

TABLE 3

| | | Rotation Angle θ [°] | | | |
|---|---|---|---|---|---|
| | | 360 | 720 | 1080 | ... | 360 × n |
| | | Rotation Number "n" [rev] | | | |
| | | 1 | 2 | 3 | ... | n |
| Movement | $\theta_{s1}$ | 1.43 | 1.48 | 1.51 | ... | 1.48 |
| Amount for | $\theta_{s2}$ | 1.42 | 1.47 | 1.51 | ... | 1.47 |
| Each Rotation | $\theta_{s3}$ | 1.42 | 1.48 | 1.52 | ... | 1.48 |
| P(n) [mm] | $\theta_{s4}$ | 1.43 | 1.49 | 1.51 | ... | 1.49 |

In this case, the controller 12 may further calculate minimum values, maximum values, and mean values of the movement amounts P(n) calculated by using the plurality of predetermined rotation angles $\theta_{S1}$ to $\theta_{Sn}$ as bases. As an example, maximum values, minimum values, and mean values of the movement amounts P(n) corresponding to the rotation angles $\theta_{S1}$ to $\theta_{S4}$ in Table 3 are illustrated in the following Table 4.

TABLE 4

| | Max. Value [mm] | Min. Value [mm] | Mean Value [mm] |
|---|---|---|---|
| $\theta_{s1}$ | 1.52 | 1.43 | 1.50 |
| $\theta_{s2}$ | 1.51 | 1.42 | 1.49 |
| $\theta_{s3}$ | 1.52 | 1.42 | 1.50 |
| $\theta_{s4}$ | 1.51 | 1.43 | 1.51 |

Thus, according to the present embodiment, the user can calculate the movement amounts P(n) by using the plurality of rotation angles $\theta_{S1}$ to $\theta_{Sn}$ as bases, and evaluate the fluctuations in the thread pitches at the positions of the rotation angles $\theta_{S1}$ to $\theta_{Sn}$. Due to this, the user can analyze the fluctuations in the thread pitches in more detail.

In the above-mentioned embodiment, a case was described where the system 30 includes the display 40 to display the calculated movement amounts P(1) to P(n). However, the system 30 may not include the display 40. For example, instead of applying the display 40, the system 30 may inform the user of the calculated movement amounts P(1) to P(n) by printing the movement amounts on a print medium.

The system 30 may also transmit the calculated movement amounts P(1) to P(n) to an external device via a network. Otherwise, the system 30 may only store the calculated movement amounts P(1) to P(n) as data, without informing the user.

In the above-mentioned embodiment, a case where the system 30 includes the storage 38 was described. However, the system 30 may, for example, transmit the calculated movement amounts P(1) to P(n) to an external device via a network and make the external device to store the movement amounts therein.

In the above-mentioned embodiment, a case was described where the calculation part 36 of the system 30 is included in the controller 12 of the machining system 10. However, the calculation part 36 may be constituted as an independent component separated from the controller 12.

The invention was described above through an embodiment thereof, but the invention is not limited to the above embodiment. An embodiment that is a combination of features described in the present embodiment of the invention may also be included in the technical scope of the invention. However, all combinations of these features may not always be indispensable to a solution of the invention. Furthermore, it is clear for a person skilled in the art that it is possible to apply various modifications and improvements to the present embodiment described above.

Note that the execution sequence of respective operations, such as functions, procedures, steps, processes, and phases, in the devices, the systems, the programs, and the methods described in the claims, the description, and the drawings does not specifically include an expression "before", "in advance", or the like, and may be carried out in any order unless an output from a preceding operation is used in a succeeding operation. Even if an operation flow in the claims, the description, and the drawings is described by using expressions "first", "next", "then" or the like for convenience, it does not mean that carrying out in this order is indispensable.

What is claimed is:

1. A system for calculating a thread pitch of threads formed on a workpiece by a synchronized operation between a rotary shaft which rotates the workpiece and a feed shaft which feeds a tool, comprising:
    a first detection part which detects a rotation angle of the rotary shaft;
    a second detection part which detects a movement amount of the feed shaft; and
    a calculation part which calculates the movement amount for each rotation of the rotary shaft when forming threads on the workpiece, based on the rotation angle detected by the first detection part and on the movement amount detected by the second detection part.

2. The system according to claim 1, further comprising a display which displays the movement amount for each rotation calculated by the calculation part.

3. The system according to claim 1, wherein the calculation part further calculates at least one of a minimum value, a maximum value, and a mean value of the movement amount for each rotation.

4. The system according to claim 1, wherein the calculation part calculates the movement amount for each rotation by using a predetermined rotation angle as a starting point.

5. The system according to claim 4, wherein the predetermined rotation angle is a rotation angle of the rotary shaft at the point of time when the threading on the workpiece is started.

* * * * *